United States Patent
Aboaf et al.

(10) Patent No.: US 6,278,577 B1
(45) Date of Patent: Aug. 21, 2001

(54) ASYMMETRIC RECORDING HEAD FOR SAME GAP SERVO OPTIMIZATION

(75) Inventors: Joseph Adam Aboaf; Edward Virgil Denison; Jules David Friedman; Vincent Noel Kahwaty, all of Tucson, AZ (US)

(73) Assignee: International Business Machines, Corp., Armonk, NY (US)

( * ) Notice: Subject to any disclaimer, the term of this patent is extended or adjusted under 35 U.S.C. 154(b) by 0 days.

(21) Appl. No.: 08/438,319

(22) Filed: May 10, 1995

(51) Int. Cl.[7] .................................................. G11B 5/265
(52) U.S. Cl. ............................................................ 360/121
(58) Field of Search ................................... 360/113, 121, 360/126, 316

(56) References Cited

U.S. PATENT DOCUMENTS

| | | | |
|---|---|---|---|
| 4,317,147 | 2/1982 | Daughenbaugh et al. | 360/113 |
| 4,885,650 | 12/1989 | Banka et al. | 360/122 |
| 5,031,064 | 7/1991 | Ashikawa et al. | 360/122 |
| 5,136,775 | 8/1992 | Onoe et al. | 29/603 |
| 5,153,980 | * 10/1992 | Kira | 360/121 |
| 5,276,574 | 1/1994 | Abe et al. | 360/126 |
| 5,289,328 | * 2/1994 | Saliba | 360/121 |
| 5,307,217 | * 4/1994 | Saliba | 360/121 |
| 5,331,493 | 7/1994 | Schwarz | 360/113 |
| 5,436,780 | * 7/1995 | Nagata et al. | 360/121 |

FOREIGN PATENT DOCUMENTS 62-208404   9/1987   (JP) .

* cited by examiner

Primary Examiner—David Davis
(74) Attorney, Agent, or Firm—David W. Collins

(57) ABSTRACT

A multi-element read-write magnetic recording head for recording information on a magnetic tape and for reading recorded information therefrom is provided. The recording head comprises an equal number of associated read elements and write elements to form a two-gap recording head comprising pairs of read and write elements. The two-gap recording head further comprises a first module and a second module, the first and second modules each comprising a plurality of read and write head elements. A first group of read and write heads is configured to perform in a forward direction of movement of the magnetic tape and a second group of read and write heads is configured to perform in a reverse direction of movement of the magnetic tape. One of the modules contains an equal number of forward read heads and reverse write heads and the other of the modules contains an equal number of reverse read heads and forward write heads, to provide decoupling of reading and writing functions and to enable servoing by a given read element of a write element associated therewith. Asymmetry of the magnetic recording head is provided by offsetting leads to the read elements in a given module from leads to said write elements in the same module, while maintaining orthogonality between read and write element leads near the read and write elements. The asymmetry minimizes both inductive and capacitive feedthrough into adjacent readers. As a consequence, noise produced during the writing process is reduced, providing an improved signal-to-noise ratio and thereby permitting same gap servoing.

7 Claims, 3 Drawing Sheets

ASYMMETRIC RECORDING HEAD FOR SAME GAP SERVO OPTIMIZATION

CROSS-REFERENCE TO RELATED APPLICATION

The present application is related to co-pending application Ser. No. 08/438,317 filed on even date herewith, entitled "Piggyback Magneto-Resistive Read/Write Tape Head with Optimized Process for Same Gap Read/Write" [TU-994-049]. That application is directed to an improved read/write head having at least one of the following elements: (1) a grounded wear shield between the read element and the write element for decoupling read and write functions, for allowing same module read/servo/write functions simultaneously, and for grounding static charge from tape media; (2) a layer of electrically conductive and corrosion-resistant material beneath a hard film bias layer, which is part of the read element, to reduce resistance of the read element; and (3) a non-activating dummy coil turn closer to the pole tips of the writing element than activating coil turns for improved ease of processability.

TECHNICAL FIELD

The present invention relates generally to magnetic recording, and, more particularly, to a thin-film magneto-resistive (MR) head having the ability to servo in the same gap line which is writing with the center of read elements separated from the enter of write elements.

BACKGROUND ART

Business, science, and entertainment applications depend upon computers to process and record data, often with large volumes of data being stored or transferred to non-volatile storage media. The non-volatile storage media typically include magnetic discs, magnetic tape cartridges, optical disk cartridges, floppy diskettes, or floptical diskettes. The advantages of storing data on non-volatile storage media are numerous, including: a capability of storing hundreds of megabytes or even gigabytes of data (additional cartridges can be used to store still more data); providing a vehicle for long term storage and archival; backing up that data which resides on non-removable media; and providing a convenient vehicle for transferring data between computers. Typically, magnetic tape media is the most economical means of storing or archiving data.

The amounts of data stored, accessed and processed by computers has increased as the computing power of the internal processors has increased. Hence, storage technology is continually pushed to increase storage capacities (as well as storage reliability). Improvements in storage densities in magnetic storage media, for example, have come in many areas, including improved media materials, improved error correction techniques, and decreased bit sizes. The amount of data stored on half-inch magnetic tape, for example, has increased from megabytes of data stored on nine data tracks to gigabytes (Gbytes) of data stored on 128 tracks of data.

The improvement in data densities on magnetic storage media is due in large part to improvements made in the transducer used for reading and writing data to the magnetic storage medium. A major improvement in transducer technology has been realized with the magneto-resistive (MR) transducer developed by the IBM Corporation. The MR transducer detects magnetic field signals as resistance changes in an MR stripe. Data densities can be increased using an MR transducer because signal levels for the MR transducer are typically much higher than for conventional inductive read heads. Furthermore, the output of the MR transducer depends only on the instantaneous magnetic field from the media and is independent of media velocity or time rate of change of the sensed fields.

In a three-gap magnetic recording head, two read heads are separated by a write head; the entire distance is on the order of 1,500 to 5,000 $\mu$m and can result in misalignments approaching 15 to 20 $\mu$m due to tape skew. In a two-gap magnetic recording head, a single read head and a single write head are provided side-by-side photolitho-graphically, resulting in possible misalignments less than a micrometer. Consequently, the two-gap magnetic recording head can provide significant advantages over a three-gap head.

A two-gap version of a 13 Gbyte head would be a cost reduction and performance improvement over the present three-gap head. Due to track misregistration (TMR) considerations, only a two-gap head will give adequate performance. A key requirement of this type of head is the ability to servo in the same gap line which is writing with the center of read elements separated from the center of write elements by only 408 $\mu$m. The present invention describes a head design which achieves very good signal-to-noise ratio (SNR) with "same-gap-servo".

DISCLOSURE OF INVENTION

In accordance with the present invention, a multi-element read-write magnetic recording head for recording information on a magnetic tape and for reading recorded information therefrom is provided. The recording head comprises an equal number of associated read elements and write elements to form a two-gap recording head comprising pairs of read and write elements. The two-gap recording head further comprises a first module and a second module, the first and second modules each comprising a plurality of read and write head elements. A first group of read and write heads is configured to perform in a forward direction of movement of the magnetic tape and a second group of read and write heads is configured to perform in a reverse direction of movement of the magnetic tape. One of the modules contains an equal number of forward read heads and reverse write heads and the other of the modules contains an equal number of reverse read heads and forward write heads, to provide decoupling of reading and writing functions and to enable servoing by a given read element of a write element associated therewith.

Asymmetry of the magnetic recording head is provided by offsetting leads to the read elements in a given module from leads to the write elements in the same module, while maintaining orthogonality between read and write element leads near the read and write elements. The asymmetry minimizes both inductive and capacitive feedthrough into adjacent readers. As a consequence, noise produced during the writing process is reduced, providing an improved signal-to-noise ratio and thereby permitting same gap servoing.

This is apparently the first time the "same-gap-servo" problem has been adequately solved, to the knowledge of the inventors.

BEST MODES FOR CARRYING OUT THE INVENTION

Figure 1:
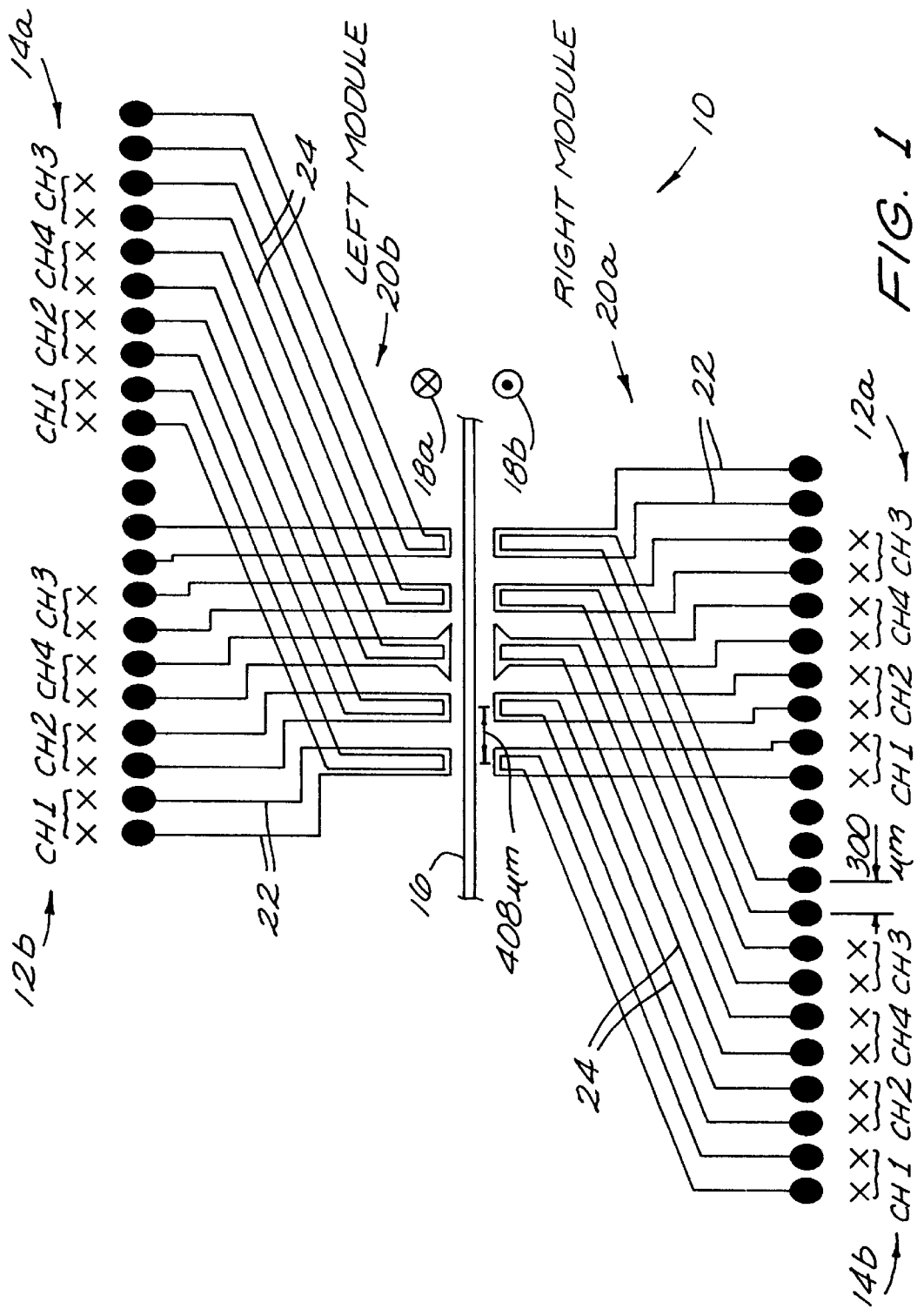
FIG. 1 is a simpified schematic view of write and read heads in an asymmetric configuration in accordance with the present invention.

FIG. 1 shows a simplified view of the design concept of a recording head 10 of the present invention, in which write 12 and read 14 head elements are schematically represented in an asymmetric configuration. On a given track line 16, there are two write 12a, 12b and two read 14a, 14b elements which are used in a read after write configuration. Tape (not shown) running along the track line 16 may be traveling in a forward direction 18a into plane of page (x) or in a reverse direction 18b out of plane of page giving rise to forward writing 12a and forward reading 14a and reverse writing 12b and reverse reading 14b. The forward write element 12a and reverse read element 14b comprise one module 20a, denoted here as the right module, and the reverse write element 12b and forward read element 14a comprise another module 20b, denoted here as the left module.

In some low cost drives, it would be possible to use just one module where an envelope type of read verify is accomplished with the read element immediately below the write element. While writing with two write elements, 12a (e.g., CH1), 12b (e.g., CH2), it is possible to servo with a read element 14b (e.g., CH3), respectively, in the same gapline. Normally, servoing is not possible because of the high noise produced during the writing process.

The asymmetric design shown in FIG. 1 is specifically laid out to minimize the lengths of write leads 22 and maintain orthogonality between write element leads 22 and read element leads 24. This layout minimizes both inductive and capacitive feed-through into the adjacent readers. As seen in FIG. 1, the asymmetry results from the combination of the minimum length write leads 22 and the off-angle read leads 24 which, however, are brought to orthogonality within the magnetic head 10.

As an example of a 13 Gbyte recording head, I/O pads 26 are on 300 μm centers and the device pitch is 408 μm. The device is seen to be rotationally symmetric, which permits use of the same device in both left and right position. The x's represent wired devices.

Figure 2:
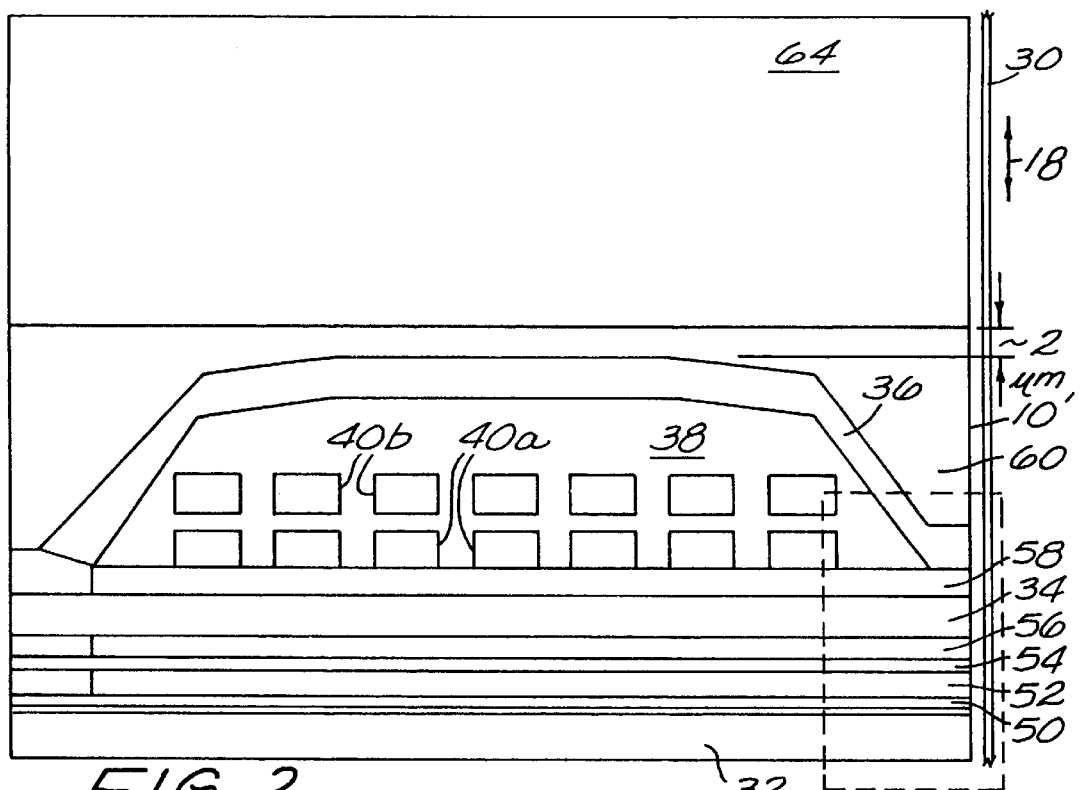
FIG. 2 depicts a cross-sectional view of a piggy-back write-read construction of the head shown in FIG. 1 and the various shields employed.

FIG. 2 shows a cross-section of the piggy-back write read construction of the thin-film magnetic head 10 of the present invention and the various shields employed for use in contact recording on flexible magnetic media, such as magnetic tape 30. The magnetic head 10 includes a magnetic substrate 32, generally made of a magnetic ceramic such as nickel zinc ferrite. A non-magnetic substrate can also be used. This could be an $Al_2O_3$—TiC substrate with a magnetic S1 shield similar to shield 50 described below, having a thickness of about 1 to 2 μm, and an insulator material. This composite is equivalent to the magnetic substrate 32. A first thin-film write pole piece 34, denoted P1, generally made of a Permalloy, that is, a nickel-iron material, is deposited over the substrate 32. A second thin-film pole piece 36, denoted P2, of the same nickel-iron material is deposited onto an insulating layer 38 which encompasses coil conductors 40 and forms a magnetic gap 42.

Figure 3:
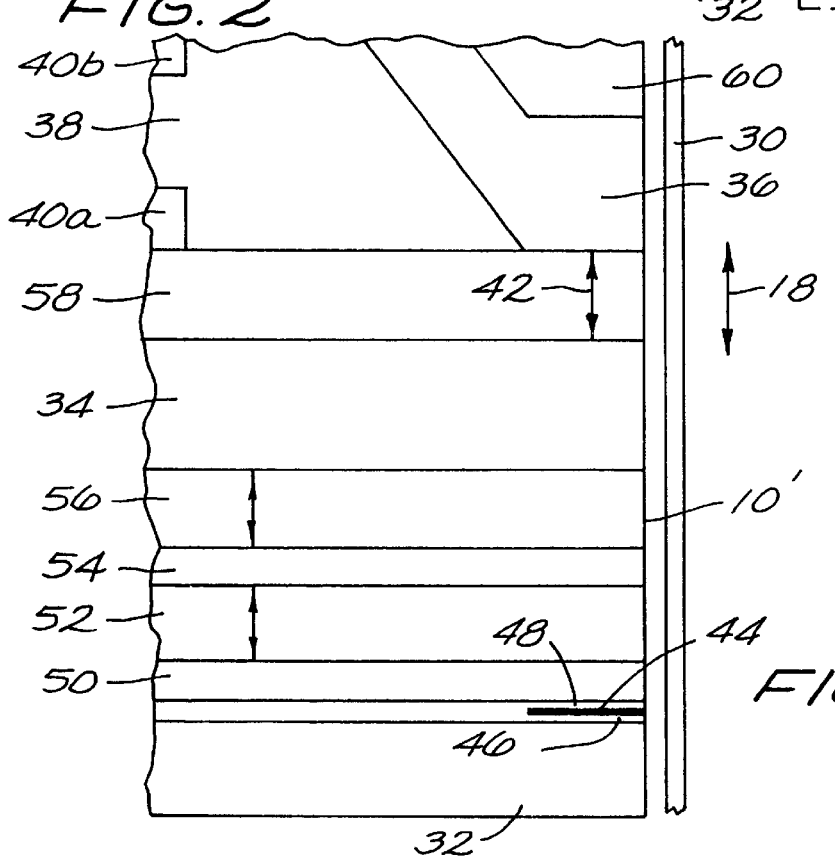
FIG. 3 is a more detailed cross-sectional view of one head element and the shielding between the read and write elements on the same track line.

The first write pole piece P1 34 is formed over a plurality of layers, starting with a soft film bias (SFB) material 44 sandwiched between two insulating layers 46 and 48, with insulating layer 46 formed on the substrate 32 (the three layers 44, 46, 48 are not visible in FIG. 2, but are shown in FIG. 3). The SFB material 44 provides the read function of the read/write head 10 and comprises a layer of NiFeRh of about 270 Å, a layer of tantalum of about 200 Å, and a layer of NiFe of about 350 Å (the magnetic layers NiFeRh and NiFe are of such composition that the magnetostriction of the films is close to zero). The two insulating layers 46, 48 may comprise any of the common insulating materials; since alumina ($Al_2O_3$) is used elsewhere in the fabrication of the magnetic head 10, it is advantageously employed here as well. To center the MR (NiFe) in the gap magnetically, the thickness of the insulating layer 46 is about 2,000 Å, while the thickness of the insulating layer 48 is about 2,200 Å.

A first shield layer 50 is next formed on the top insulating layer 48. The first shield layer 50 comprises a wear-resistant magnetic layer of about 1 to 2 μm thick. This layer is composed of laminated Fe and NiFe films (Fe, 300 to 1,800 Å thick; NiFe, 50 to 300 Å thick) deposited in a nitrogen-containing atmosphere (up to 20% nitrogen content). The first shield layer 50 is a magnetic shield and its thickness determines the read gap (discussed below) and the frequency response of the device. The thinner the layer, the higher the frequency response. Typically, a thickness of about 1 μm is employed for this layer 50.

An insulating layer 52 is formed on the first shield layer 50, and, for the reasons discussed above, advantageously comprises alumina. It is formed to a thickness in the range of 1 to 10 μm, and typically about 2 μm.

A second shield layer 54 is formed on the insulating layer 52 and acts as a wear shield, to minimize erosion of face 10' of the magnetic head 10. The second shield layer comprises a hard material (having the best wear properties), such as a NiFe—N/Fe—N laminate, and is formed to a thickness of 1 to 3 μm. (As used herein, NiFe—N and Fe—N refer to the nitrides of nickel-iron alloys and iron, respectively.) Typically, a thickness of about 1 μm is employed for this layer 54. Any magnetic material could be used, but the above laminate has the best wear properties found to date.

Another insulating layer 56 is formed on the second shield layer 54, and advantageously comprises the same material (e.g., alumina) having essentially the same thickness (e.g., about 1 μm). The first write pole piece layer P1 34 is formed on this insulating layer 56.

The first write pole piece layer P1 34 comprises a magnetic material, such as a nickel-iron alloy or multilayer NiFe/Fe laminate, and is formed to a thickness of about 2 to 6 μm. Typically, this P1 layer 34 is about 3.5 μm thick.

The second write pole piece layer P2 36 also comprises a magnetic material, advantageously the same material and thickness as the first write pole piece layer P1 34. Both P1 34 and P2 36 have the same composition.

An insulating gap layer 58 is formed on the P1 layer 34 and separates P1 from P2 36. The insulating layer 58 preferably comprises alumina and establishes gap 42 between P1 34 and P2 36. The thickness of the gap 42 controls the magnetic field between P1 34 and P2 36 created by current in the write coils 40. In the present embodiment, the gap 42 is 2.3 μm.

Two rows of activating conductor coil turns 40 are formed over the insulating gap layer 58, a first row 40a formed on the insulating gap layer and a second row 40b formed above the first row. Electrically insulating material 38 separates the two rows of coil turns 40a, 40b and also provides support for the P2 layer 36 above the coil turns. The conductor turns 40 can be made of an electrically conducting material, such as copper or gold. The electrically insulating material 38 advantageously comprises a hardened photoresist.

A leveling layer 60 of alumina and/or an epoxy material, for example, is then 20 formed over the P2 36. The leveling layer 60 is thick enough to be lapped flat and still be at a certain distance (1 to 2 $\mu$m) above the top part of the P2 layer 36. Lapping the leveling layer 60 flat provides a flat surface for bonding of a non-magnetic ceramic closure 64 to produce the completed read/write transducing element.

The magnetic tape media 30 moves in a direction as shown by arrow 18 operating in a motion transverse to the pole pieces 34 and 36 over the face, or bearing surface, 10' where the contact recording takes place.

FIG. 3 shows a more detailed cross-section of one head element and the shielding between the read and write elements on the same track line. Between the read and write elements are two layers 52, 58 of insulator material, e.g., alumina, each about 2 $\mu$m thick, and a wear/isolation shield 54, about 1 $\mu$m thick, which extends over the region where the read and write elements overlap. The wear shield 54 provides a dual function: (1) it provides magnetic isolation between the read and write portions of the head element and (2) because it comprises a hard material, it prevents wear of the alumina in the head tape contact area. In one preferred embodiment, the wear shield comprises a NiFe—N/Fe—N laminate, but other pole-tip materials could also be used. It is possible to electrically ground this wear isolation shield to further reduce capacitive coupling between readers and writers.

Separate same gap feedthrough measurements have been conducted to assess the same gap servo performance. It has been found that the same gap write noise will conservatively limit the SNR to about 26 db. In this analysis, a constant Code Power Spectral density was assumed and write equalization during feedthrough measurements was not used. Both of these assumptions create a conservative same gap servo write-limited SNR estimate.

Assuming a servo signal which is 1.4 mv p-p and a servo amplifier using a 2-pole low pass filter set at 1 Mhz, the following write-noise-limited SNR values are computed for same gap servo:

| | ACTIVE WRITERS (40 ma p-p) | | | |
|---|---|---|---|---|
| READER | CH1/CH2 | CH1/CH3 | CH2/CH3 | units |
| CH1 | 13.8 | 12.3 | 26.6* | db |
| CH2 | 10.4 | 38* | 10.9 | db |
| CH3 | 25.9* | 10.5 | 9.3 | db |

The applicable SNR values are shown with an asterisk. For example, when channels 1 and 2 (12a CH1; CH2) are recording (module 20a), channel 3 (14b CH3; module 20a) is used as the same gap servo read element and the write-noise-limited SNR is 25.9 db. Conversely, the channels 12b and 14a may be used. Adding in tape noise should decrease the SNR by 3 db and during the half track modulated signal, the SNR will decrease by 6 db. Based on an earlier analysis by the inventors of same gap servo designs, this 17 db minimum SNR is adequate to achieve same gap servoing. Very high SNR assures superior servo performance and minimizes off-track errors. These values are the best same gap servo numbers reported, to the knowledge of the inventors.

Figure 4:
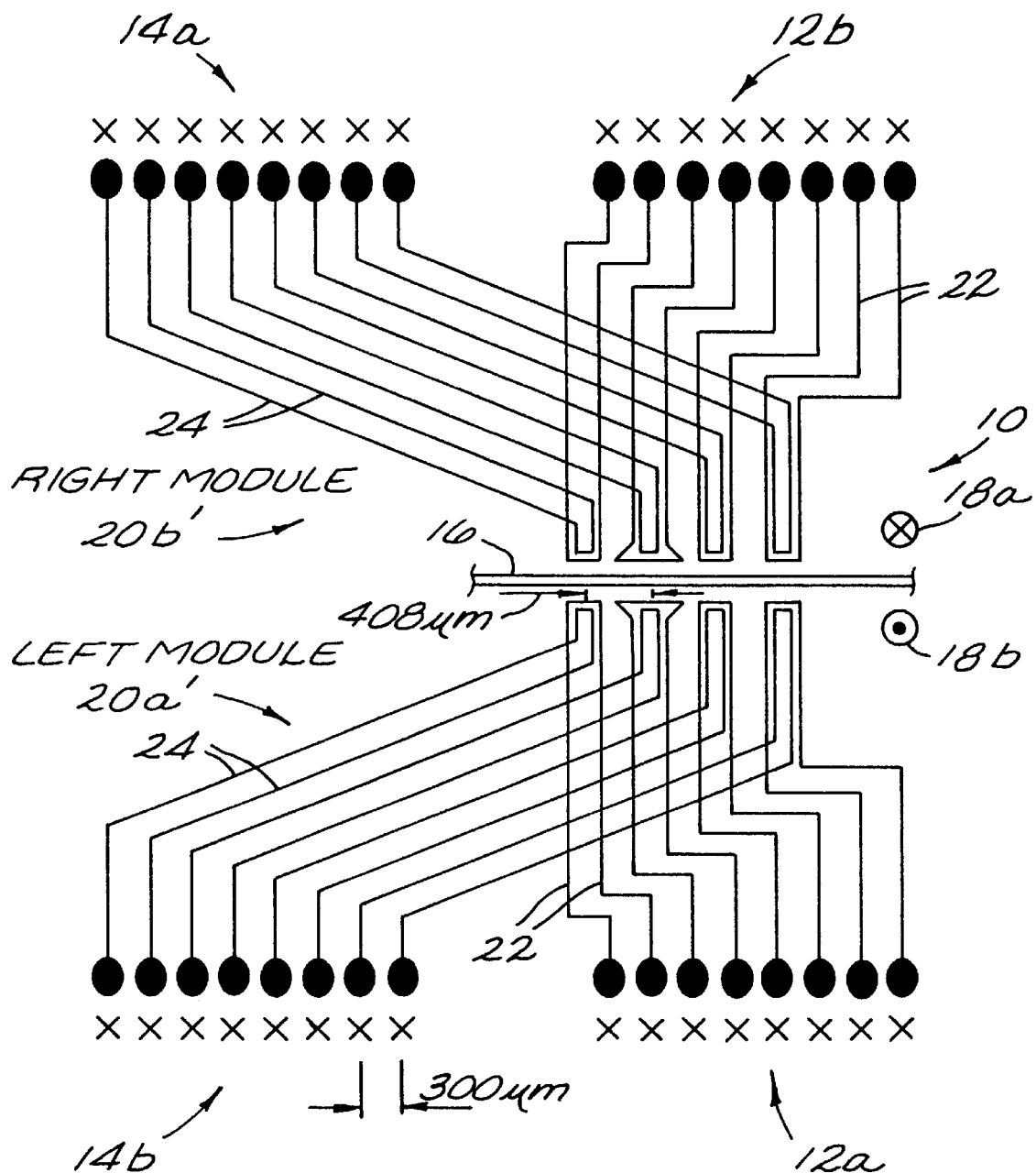
FIG. 4 depicts an alternate layout configuration than shown in FIG. 1, with the modules being rotated mirror images of one another.

An alternative layout configuration for the head 10' is shown in FIG. 4, where the modules 20a', 20b' are mirror images of one another. In this case, devices used to maintain rotational symmetry are eliminated and the footprint of the active head chip is minimized, which can lead to as much as 20% more chips per wafer to further reduce cost. However, two separate parts (one right, one left) have to be made rather than one part having only right or left devices.

INDUSTRIAL APPLICABILITY

The present invention is expected to find use in MR-based magnetic read/write heads for magnetic recording.

Thus, there has been disclosed an asymmetric recording head for same gap servo optimization. It will be readily apparent to those skilled in this art that various changes and modifications of an obvious nature may be made, and all such changes and modifications are considered to fall within the scope of the present invention, as defined by the appended claims.

What is claimed is:

1. A multi-element read-write magnetic recording head for recording information on a magnetic tape and for reading recorded information therefrom, said recording head comprising an equal number of associated read elements and write elements to form a two-gap recording head comprising pairs of read and write elements, said two-gap recording head further comprising a first module and a second module, said first and second modules each comprising a plurality of read and write head elements, with a first group of read and write heads configured to perform in a forward direction of movement of said magnetic tape and with a second group of read and write heads configured to perform in a reverse direction of movement of said magnetic tape, one of said modules containing an equal number of forward read heads and reverse write heads and the other of said modules containing an equal number of reverse read heads and forward write heads, to provide decoupling of reading and writing functions and to enable servoing by a given read element of a write element associated therewith, wherein leads to said elements in a given module are asymmetrically offset from leads to said write elements in the same module, while maintaining orthogonality between read and write element leads near said read and write elements.

2. The magnetic recording head of claim 1, wherein said modules are rotationally symmetric to each other.

3. The magnetic recording head of claim 1 wherein said modules are mirror images of each other.

4. The magnetic recording head of claim 1, comprising a plurality of thin-film magneto-resistive elements formed on a magnetic or a non-magnetic substrate.

5. The magnetic recording head of claim 4, wherein each thin-film magneto-resistive element comprises:

(a) a magnetic read element formed above said substrate and separated therefrom by an insulating layer;

(b) a magnetic write element formed above said magnetic read element, said magnetic write element comprising two pole pieces separated by an insulating layer to form a magnetic gap, said magnetic write element separated from said magnetic read element by at least one insulating layer; and (c) a plurality of activating conductor coil turns operatively associated with said magnetic write element.

6. The magnetic recording head of claim 5, further comprising at least one shield layer between said magnetic read element and said magnetic write element.

7. The magnetic recording head of claim 6, with two shield layers between said magnetic read element and said magnetic write element, one shield layer providing magnetic shielding and the other shield layer providing shielding against wear of said magnetic recording head by said magnetic tape.

* * * * *